(No Model.) 5 Sheets—Sheet 1.

O. S. HOFFMAN.
MACHINE FOR MAKING YEAST CAKES.

No. 418,841. Patented Jan. 7, 1890.

Witnesses:
Valentine Hofmann
Alfred M. Hofmann

Inventor:
Orville Spencer Hoffman

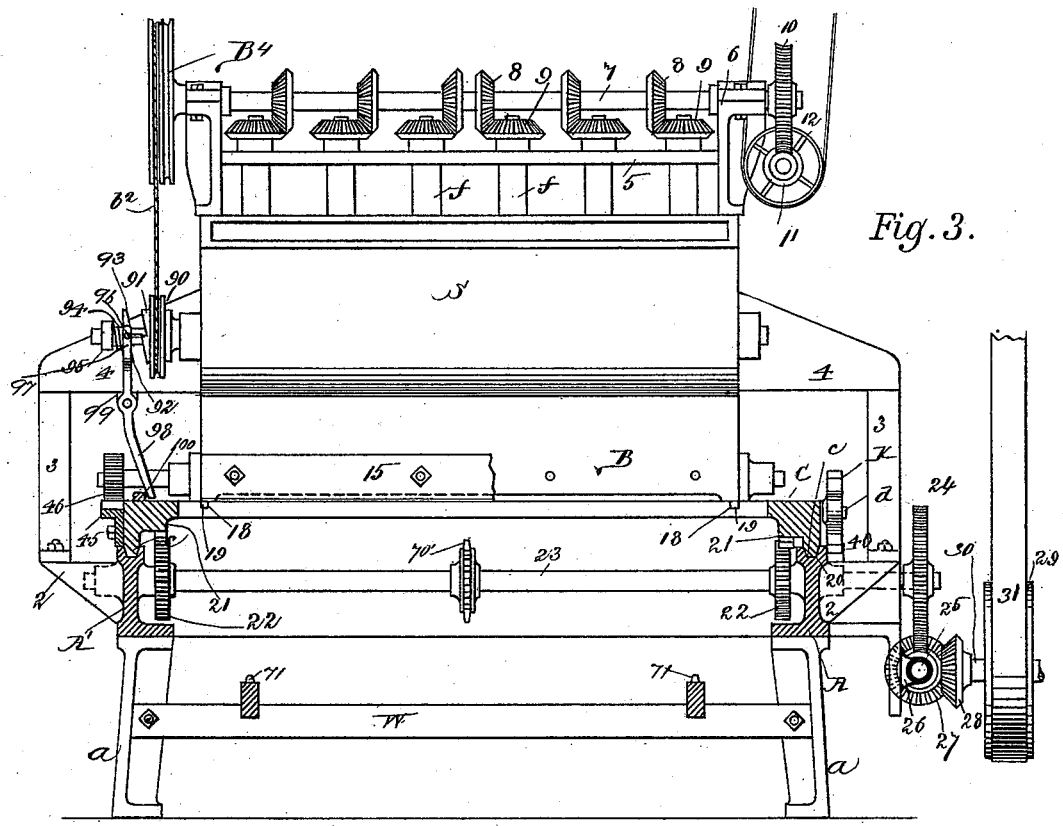
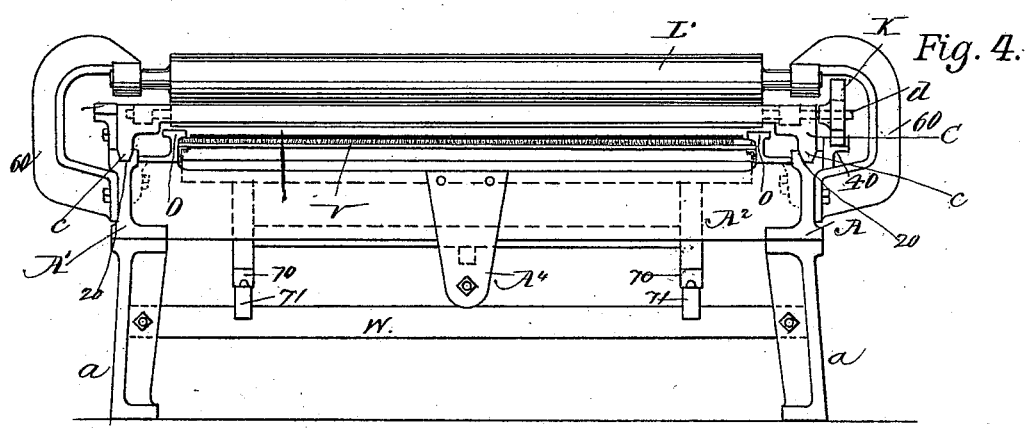

(No Model.) 5 Sheets—Sheet 3.

O. S. HOFFMAN.
MACHINE FOR MAKING YEAST CAKES.

No. 418,841. Patented Jan. 7, 1890.

Witnesses:

Inventor:
Orville Spencer Hoffman (No Model.)　　　　　　　　　　　　　　　　5 Sheets—Sheet 4.
O. S. HOFFMAN.
MACHINE FOR MAKING YEAST CAKES.

No. 418,841.　　　　　　　　　Patented Jan. 7, 1890.

Witnesses:　　　　　　　　　　　　　　　Inventor:

(No Model.) 5 Sheets—Sheet 5.
O. S. HOFFMAN.
MACHINE FOR MAKING YEAST CAKES.
No. 418,841. Patented Jan. 7, 1890.
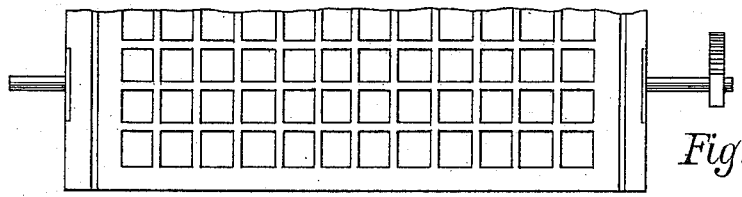
Fig. 9.
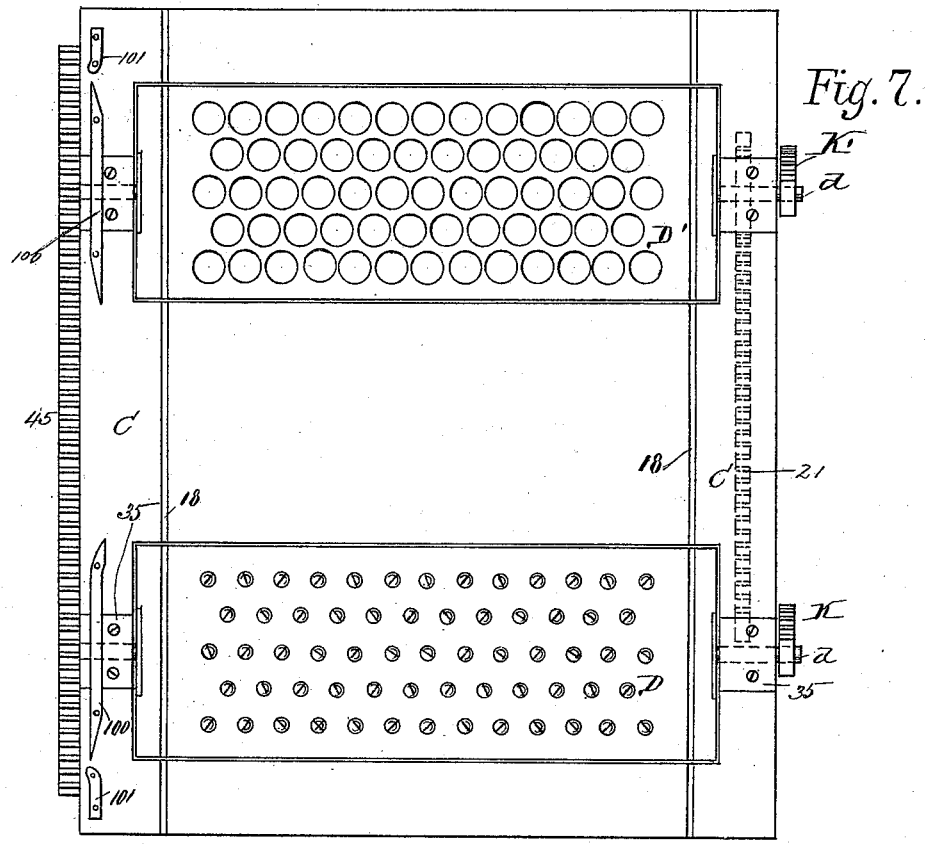
Fig. 7.
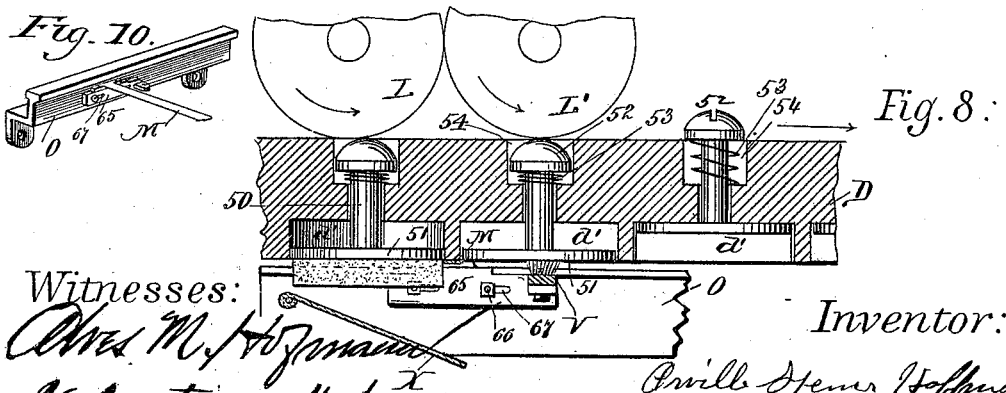
Fig. 10.
Fig. 8.
Witnesses: Inventor:

UNITED STATES PATENT OFFICE.

ORVILLE SPENCER HOFFMAN, OF CHICAGO, ILLINOIS, ASSIGNOR TO EGBERT W. GILLETT, OF SAME PLACE

MACHINE FOR MAKING YEAST-CAKES.

SPECIFICATION forming part of Letters Patent No. 418,841, dated January 7, 1890.

Application filed April 9, 1889. Serial No. 306,563. (No model.)

*To all whom it may concern:*

Be it known that I, ORVILLE SPENCER HOFFMAN, a citizen of the United States, residing at Chicago, in the county of Cook and State of Illinois, have invented certain new and useful Improvements in Machines for Making Yeast-Cakes, &c., of which I do declare the following to be a full, clear, and exact description, reference being had to the accompanying drawings, forming part of this specification.

My present invention has relation particularly to that class of machines designed for forming cakes of yeast and similar material, and in which the cakes are formed by passing a series of receptacles beneath a hopper that serves to deliver the dough into the receptacles.

The invention consists in the various novel features of construction hereinafter described, illustrated in the accompanying drawings, and particularly pointed out in the claims at the end of this specification.

Figures 1, 2:
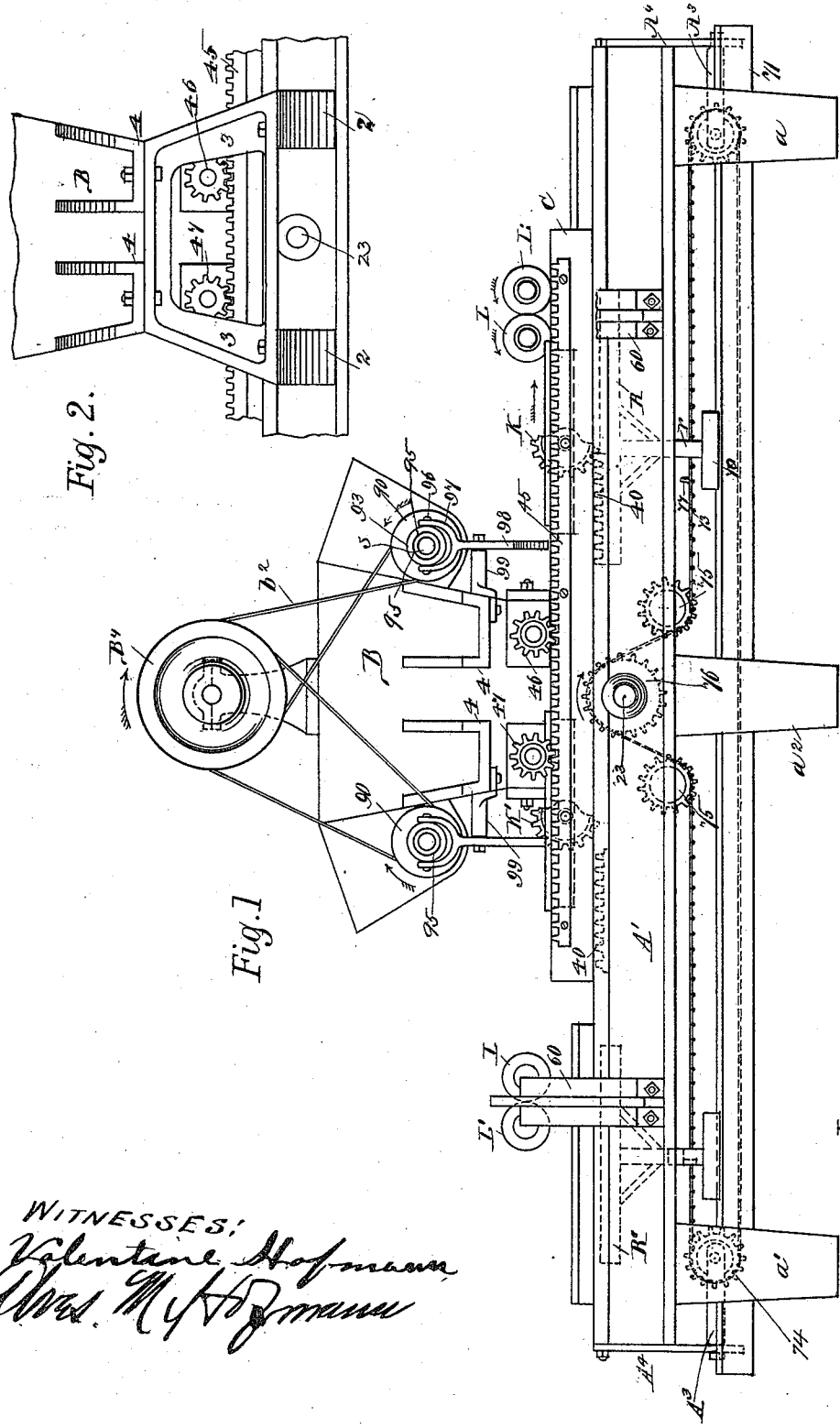
Figure 5:
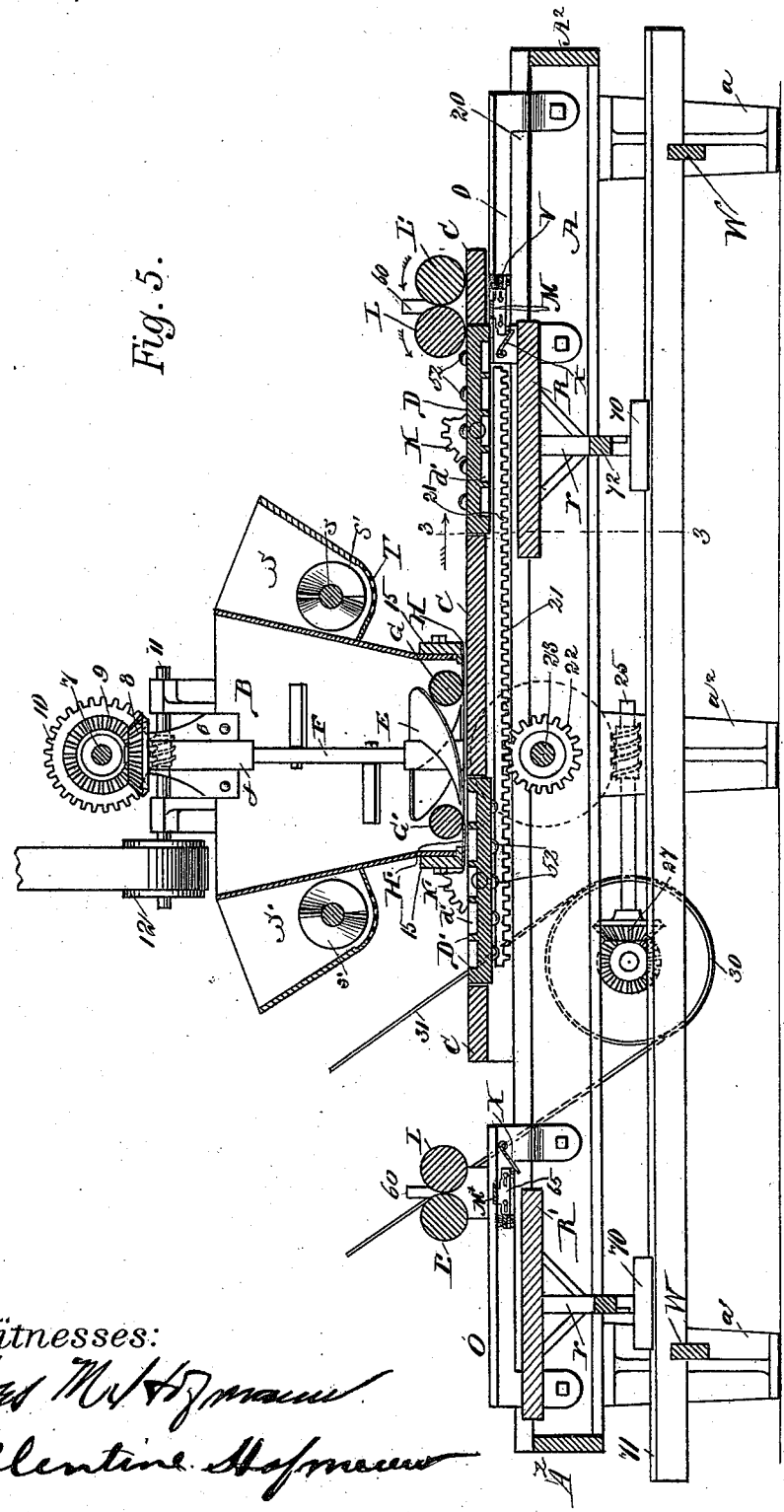
Figure 6:
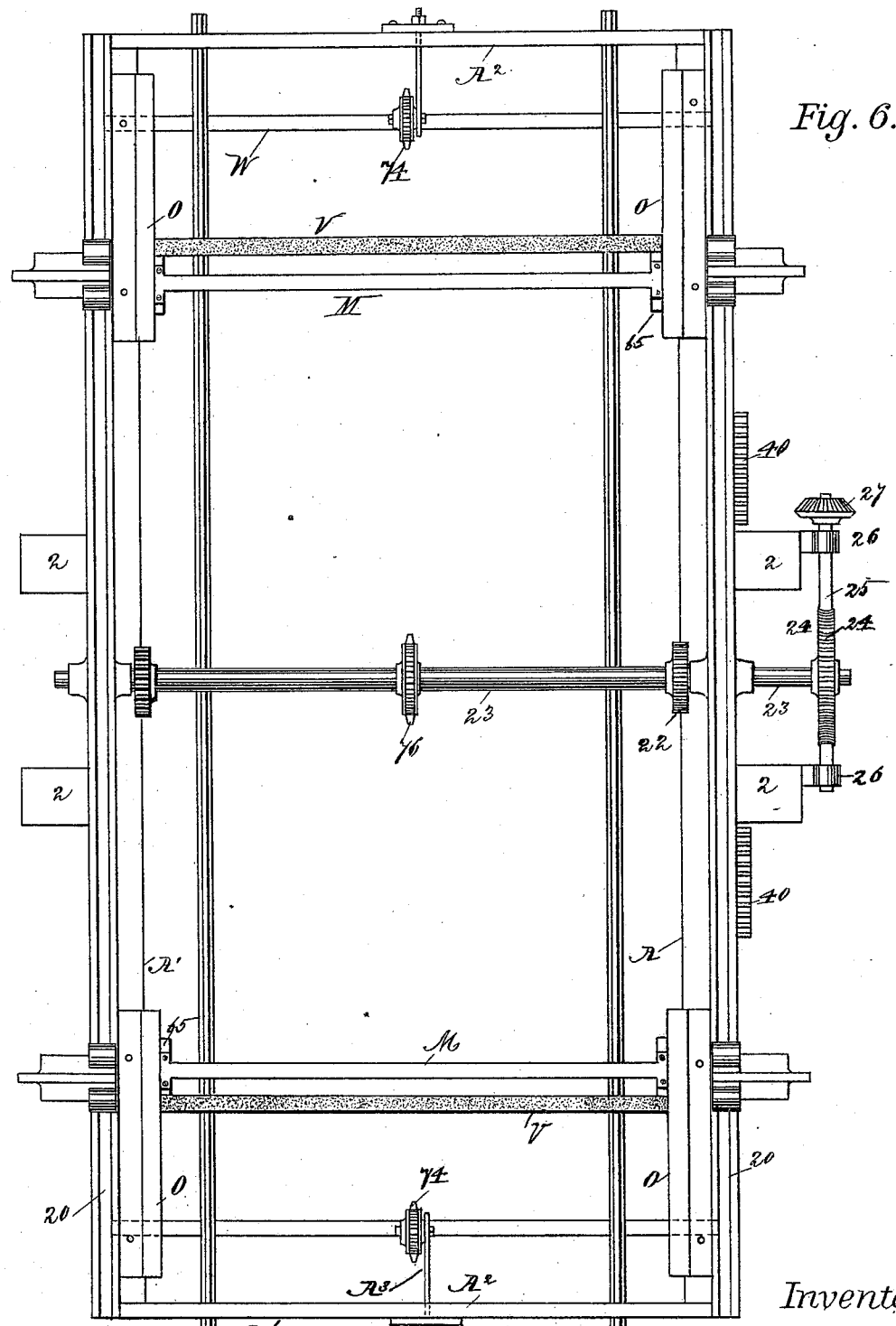

Figure 1 is a view in side elevation of a machine embodying my improvements. Fig. 2 is a detail view, in side elevation, of the lower portion of the delivery-hopper and the immediately subjacent parts of the structure. Fig. 3 is a view partly in side elevation and partly in vertical transverse section on line 3 3 of Fig. 5. Fig. 4 is a view in end elevation of the main frame and sustained parts, the hopper being removed. Fig. 5 is a view in vertical longitudinal section at one side of the center, parts being shown in elevation. Fig. 6 is a plan view of the machine-bed and part of the driving-gear, the traveling table being removed. Fig. 7 is a detail plan view of the traveling table, showing the mold-boards in position therein. Fig. 8 is an enlarged detail view, in vertical section, of a portion of one of the mold-boards, the discharge-rollers being shown in end elevation. Fig. 9 is a detail view of a modified form of mold-board. Fig. 10 is a detail perspective view of one of the adjustable knives and one of its supports.

The main frame of the machine comprises side rails A and A' and end bars $A^2$, which are supported by suitable legs $a$ and $a'$ at the end, and, by preference, also by the intermediate legs $a^2$. From the side rails A and A', adjacent their centers, extend the brackets 2, on which rest the standards 3, which, through the medium of the extensions 4, serve to sustain the hopper B, from which the extensions 4 project. The lower portion of this hopper B is extended downwardly, as more particularly seen in Fig. 5, to about the top of a traveling table C, by which the mold-boards D and D' are carried, and within this hopper are sustained the stirrer-screws E, carried at the lower ends of the vertical shafts F, that are journaled within suitable sleeves $f$, formed in the transverse frame 5, extending from end to end of the hopper. This transverse frame 5 is bolted to the top of the hopper, and from the ends of the hopper rise the standards 6, that serve to sustain the counter-shaft 7, upon which are keyed the beveled gear-wheels 8, that engage with correspondingly-beveled gear-wheels 9, affixed to the top of the vertical shafts F and serving to impart rotary movement to the stirrer-screws E within the hopper. The counter-shaft 7 is driven by means of a worm-wheel 10, keyed to its end and receiving motion from a worm-shaft 11 and pulley 12. From end to end of the hopper at its bottom extend the presser-rolls G and G', one of these rolls being located upon each side of the stirrer-screws E and serving to firmly compress the dough within the molds, as will hereinafter more fully appear.

To opposite sides of the hopper B at its bottom are affixed the bars 15, to which are bolted the knives H and H', that serve to even off the cakes of dough after the molds have been filled and prevent any excess of dough from passing from the hopper, these knives extending inwardly from the lower edges of the bars 15 through a suitable space formed in the bottom of the hopper.

By reference to Figs. 3 and 7 it will be seen that the upper face of the traveling table C and of the mold-boards D and D' is provided with grooves 18, into which enter the bottom edges 19 of the end plates of the hopper B, the purpose of this construction being to prevent the escape of dough from the ends of the hopper as the dough is compressed by the stirrer-screws and presser-rolls within the hopper. The table C is provided at its sides with rails c, that move within suitable ways 20, formed in the upper edges of the side rails A and A' of the main frame, and upon the under side of the table C, adjacent each of its rails c, are formed the rack-bars 21, with which engage the driving-pinions 22, that are keyed upon a counter-shaft 23, journaled in the side rails A and A' of the machine about its center. The counter-shaft 23 has one end extended beyond the main frame of the machine, and is provided with a worm-wheel 24, that receives motion from a worm-shaft 25, journaled in brackets 26, and to one end of this shaft is affixed a bevel gear-wheel 27, that is driven by the correspondingly-beveled gear-wheel 28 and the main drive-pulley 29 on the shaft 30, a suitable belt 31 serving to impart movement to this main drive-pulley from the source of power. The mold-boards D and D' are held within suitable cut-away spaces in the main table by means of the journals d, that project from each end of the mold-boards, and are held within suitable bearings 35 at the sides of the table C, (see Fig. 7,) and upon the ends of the journals d are fixed the segment gear-plates K and K', which at proper times will engage with the short rack-bars 40, that are affixed to the sides A and A' of the main frame. Suitable rest-bars O, bolted to the inner sides of the rails A and A', adjacent their ends, serve to support the mold-boards D and D' when they have been reversed by the segmental gear-plates and rack-bars. To the side rails c of the traveling table C is affixed a rack-bar 45, which will at proper intervals engage with the cog-wheels 46 and 47 upon the journals of the presser-rolls G and G'.

From the construction of parts as thus far defined it will be seen that when the dough has been placed in the hopper B and motion has been imparted to the stirrer-screws E, and through the medium of the belt 31 and through connected gear mechanism to the shaft 23, the pinions 22, by reason of their engagement with the rack-bars 21, will cause the table C to move in one direction beneath the hopper. As the table C thus moves beneath the hopper it will bring one of the mold-boards—for example, the mold-board D—into position to have the cups or receptacles d' of this board filled with the dough, and when the motion of the machine is reversed, causing the table C to travel in opposite direction, the mold-board D will be moved away from beneath the hopper B. As the mold-board D is thus moved from beneath the hopper the presser-roll G will serve to firmly pack the dough into the receptacles d', while the knife H will even off the upper surface of the dough within the receptacles and prevent any excess passing from the hopper. As soon as the mold-board D has thus passed completely from beneath the hopper its segmental gear-plate K will engage with the short rack-bar 40, and a half-revolution will be imparted to the mold-board D in order to turn its receptacles upside down, as seen at the right-hand side of Fig. 5 of the drawings. Each receptacle d' of the mold-board is provided with a plunger 50, that passes through a perforation formed in the mold-board and carries at one end a plate 51, that forms the bottom of the receptacle d', and upon which the dough will be compressed, and at the opposite end of the plunger 50 is formed a head 52, against which will bear a coiled spring 53, that encircles the plunger 50, and is retained within a suitable cut-away space 54, formed in the back of the mold-board, as seen in Fig. 8.

Near each end of the machine are placed suitable discharge-rolls L, that are journaled within brackets 60, that rise from the sides A and A' of the main frame, these brackets being curved (see Fig. 4) in such manner as to permit the segment gear-plates K and K' to pass freely beneath them. From this construction, and by particular reference to Figs. 5 and 8 of the drawings, it will be seen that after the mold-board D has had its receptacles filled and has been reversed by the engagement of the gear-plate K with the short rack-bar 40, so as to bring it to the position seen at the right-hand side of Fig. 5 of the drawings, the discharge-rolls L will bear upon the heads 52 of the plungers 50 and will force these plungers downwardly against the action of the coiled springs 54, thereby causing the plates 51 to project the cakes of yeast or like material from the receptacles.

In order to insure the accurate and complete discharge of the dough from the receptacles, I prefer to employ at each end of the machine a knife M, that extends from side to side of the machine at a point beneath the presser-rolls L, this knife being supported at its ends by the adjustable blocks 65, that are adjustably attached to the sides of the rest-bars O by means of the bolts 66, that pass through the slots 67 of the blocks and through suitable bolt-holes in the rest-bars. By thus mounting the knives upon adjustable blocks not only can they be readily removed for the purpose of sharpening, but can also be brought into accurate position to properly remove the cakes from the plates 51 of the plungers.

From side to side of the machine between the side rails A and A' and at a point beneath the knife M extend the guide-plates X, upon which the cakes will fall as they are removed from the plates 51 of the plungers, these plates serving to direct the cakes accurately into the receiving-tray beneath. Behind the presser-rolls L, I prefer to place suitable presser-rolls L', similar to the presser-rolls L, for the purpose of depressing the plungers 50 in such manner that their plates 51 will be forced outward into position to be acted upon by suitable brushes V, that are bolted to the side frames of the machine and extend across the machine at points beneath the rolls L'. In order to receive the cakes of yeast as they are thus forced from the receptacles of the mold-boards, I prefer to employ two tray-tables R and R′, that are sustained by the standards r, the shoes 70 of these standards resting upon the rails 71, that extend from end to end of the machine and are supported by the cross-bars W. Between the standards r of the tray-table R, at a slight distance above the shoes 70, extend the cross-bars 72, and beneath these cross-bars travels the carrier-chain 73, that passes over suitable sprockets-wheels 74, that are journaled at the ends of the rods $A^3$, extending from the brackets $A^4$ between the side rails of the machine at each end, and this chain passes also beneath the idler sprocket-wheels 75 and over a driving sprocket-wheel 76, that is keyed to the counter-shaft 23. This sprocket-chain 73 is provided with the drive-fingers 77, projecting upward into position to engage with the cross-bars 72 when the carrier-chain 73 is moved. From this construction it will be seen that if a suitable tray be placed upon the tray-table R and this table be shoved by the attendant inward, so that its rear edge is beneath the edge of the discharge-knife M, the cakes of yeast as they are discharged from the receptacles of the mold-board will be delivered into the pan or tray, and as soon as this discharge begins the drive-finger 77 of the chain 73 will contact with the cross-bar 72 of the tray-table, and will cause this table and the pan or tray thereon to move outward at a slightly greater speed than the traveling table C and the mold-board D, so that the cakes of yeast will be distributed evenly over the surface of the pan. When the mold-board D has thus been emptied, the direction of travel of the table C will be reversed, and after it has moved inward far enough to reverse the mold-board D the attendant at one end of the machine, having removed the filled tray from the table R, will again shove this table, with a fresh pan or tray thereon, into proper position to receive the cakes when the mold-board D is next moved into the position last described.

In order to reverse the direction of travel of the machine, I provide any suitable form of automatic reversing-gear upon the pulley-shaft 30—such, for example, as the well-known reversing-gear employed in planing-machines and the like. The construction of such gear, being well understood, need not be particularly described.

Assuming that the mold-board D has passed beneath the presser-rolls L and the cakes have been discharged from the receptacles, and assuming also that the direction of travel of the table C has been reversed, it will be found that the mold-board D′ at the opposite end of the table will be in position beneath the hopper B and will have its receptacles filled with the dough, so that as it passes from beneath the hopper the presser-roll G′ will firmly compact the dough therein and the knife H′ will even off the upper face of the cakes in the manner hereinabove described.

At the time that the mold-board D′ has completely passed from beneath the hopper the segmental gear-plate K′ will engage with the short rack-bar 40 and will impart to the mold-board D′ a half-revolution, so as to bring the receptacles into proper position to discharge their cakes into a suitable tray that will be placed upon the corresponding table R′ and as the mold-board D′ passes beneath the discharge-roll L its plungers 50 will be depressed and will force the cakes from the receptacles, permitting them to be cleanly removed by the discharge-knife M′ into the pan or tray. At the time that the mold-board D′ begins to pass under the presser-rolls L the drive-finger 77 upon the chain 73 will engage with the cross-bar 72 of the tray-table R′ and will cause this table and the pan or tray thereon to move outward, so as to properly lay the cakes over the surface of the tray. At the front and rear sides of the hopper B are attached the meal or sifting hoppers S and S′, through which extend the shafts s, carrying suitable stirrer-blades s′, and upon the end of each of these shafts s is loosely held a pulley 90, that is geared with the counter-shaft 7 by means of the pulley $B^4$ and the belt $b^2$, and upon the outer face of the loose pulley 90 are formed suitable teeth 91, adapted to engage with the corresponding teeth 92, formed upon a toothed sleeve 93, that is keyed to the shaft s in a manner permitting it to be moved thereon in longitudinal direction. This sleeve 93 is held in proper position by means of a coiled spring 94, that encircles the shaft between the sleeve 93 and the collar 95 of the shaft, and to the sleeve 93 is connected by the trunnions 96 the yoke-shaped end 97 of the clutch-lever 98, that is pivotally sustained upon an arm 99, bolted to the brackets that sustain the hopper. The lower end of the clutch-lever 98 extends to a point adjacent the upper surface of the traveling table C, upon which are affixed the clutch-bars 100, with which the ends of the clutch-levers 98 will contact as the traveling bed C is moved back and forth, and adjacent the outer end of these bars 100 are fixed the guide-bars 101, having curved inner ends to properly direct the movement of the ends of the clutch-levers. Thus it will be seen by reference more particularly to Figs. 1, 3, and 7 of the drawings that as the traveling table C is moving in a direction the reverse of that shown by arrows in Figs. 1 and 5 the inclined end of the throw-off bar 100 adjacent the end of the mold-board D will contact with the end of the pivoted clutch-lever 98 and will cause this lever to throw the sleeve 93 into engagement with the teeth 91 of the constantly-driven pulley 90. This will occur about the time that the segmental gear-plate K has engaged with the short rack-bar 40 and has turned the mold-board D in such manner that its receptacles face upward, so that as the mold-board passes beneath the perforated bottom T of the meal-hopper S the rotation of the shaft s and the stirrers s' will cause the meal to sift through the perforated bottom of the hopper and into the receptacles of the mold-board, so as to prevent the cakes of yeast from adhering too firmly to the sides and bottom of the receptacles. As soon as the traveling table C has moved so far that the rear end of the clutch-bar 100 passes the end of the clutch-lever 98 the inclined end of the guide-bar 101 will contact with the end of the clutch-lever 98 and will direct this lever into position to pass along the opposite side of the bar 100 when the motion of the traveling table C is reversed, thereby causing the clutch-teeth 91 and 92 to disengage and the sifting of the meal from the meal-hopper S to cease.

The construction of mold-board illustrated in Fig. 9 of the drawings does not differ from the mold-boards above described, except that its pockets or receptacles are square instead of round, and it is obvious that any desired shape may be given to these pockets. So, also, a single mold-board may be employed without departing from the spirit of my invention, and the skilled mechanic may modify the details of construction above set out or may employ features of the invention without its adoption as an entirety.

Having thus described my invention, what I claim as new, and desire to secure by Letters Patent, is—

1. In a machine for making yeast-cakes, &c., the combination, with an open-bottom delivery-hopper, of a reciprocating table mounted to travel beneath said hopper and provided with a reversible mold-board, substantially as described.

2. In a machine for making yeast-cakes, &c., the combination, with a suitable delivery-hopper having an open bottom, of a reciprocating table provided with one or more reversible mold-boards and suitable means for reversing said mold-boards, substantially as described.

3. In a machine for making yeast-cakes, &c., the combination, with a suitable hopper having an open bottom, of a traveling table C, the mold-boards D and D', pivotally mounted in said table, suitable gear-plates K, connected with said mold-boards, and rack-bars 40, for operating said gear-plates to reverse the mold-boards, substantially as described.

4. In a machine for making yeast-cakes, &c., the combination, with a delivery-hopper having a broad open bottom, of a traveling table, suitable mold-boards mounted in said table, and suitable presser-rolls and stirrer-blades located within the hopper for forcing the dough into the pockets of the mold-boards, and suitable knives at each side of the hopper for evening off the surface of the cakes, substantially as described.

5. In a machine for making yeast-cakes, &c., the combination, with a delivery-hopper, of a reciprocating table C, a mold pivotally mounted in said table, said mold being provided with plungers 50, and a suitable presser-roll for forcing said plungers outward to discharge the cakes, substantially as described.

6. In a machine for making yeast-cakes, &c., the combination, with a delivery-hopper, of a traveling table C, having a reversible mold-board mounted therein, suitable means for reversing said mold-board, plungers extending through said mold-board for forcing out the cakes, suitable means for depressing said plungers, and a knife located beneath the traveling table to remove the cakes from the plungers, substantially as described.

7. In a machine for making yeast-cakes, &c., the combination, with a delivery-hopper, of a traveling table provided with a reversible mold-board, suitable spring-actuated plungers extending through said mold-board, suitable means for depressing said plungers, a knife for removing the cakes from said plungers, and a guide for directing said cakes into a tray or pan, substantially as described.

8. In a machine for making yeast-cakes, &c., the combination, with a delivery-hopper, of a traveling table provided with a reversible mold-board having pockets with spring-actuated plungers therein, a brush extending across the under side of said table, and a presser-roll above said brush and above said table for depressing the plungers to permit their faces to be cleaned by said brush, substantially as described.

9. In a machine for making yeast-cakes, &c., the combination, with a delivery-hopper, of a traveling table provided with a reversible mold-board having spring-actuated plungers, a suitable presser-roll for depressing said plungers, a knife for removing the cakes from said plungers, a presser-roll for again depressing said plungers, and a brush for cleaning the ends of said plungers, substantially as described.

10. In a machine for making yeast-cakes, &c., the combination, with a delivery-hopper, of a traveling table provided with a reversible mold-board having movable plungers, means for depressing said plungers, and an adjustable knife located beneath the table for removing the cakes from the plungers, substantially as described.

11. In a machine for making yeast-cakes, &c., the combination, with a delivery-hopper, of a traveling table provided with a reversible mold-board, suitable means for removing the cakes from said mold-board, a tray-table movably mounted beneath said traveling table, and a suitable carrier-chain for causing said tray-table to move in unison with the mold-board as the discharge of the cakes therefrom occurs, substantially as described.

12. In a machine for making yeast-cakes, &c., the combination, with the delivery-hopper, of a traveling table provided with a mold-board, a mealing-hopper, a suitable agitator for causing the meal to sift from said hopper, and clutch mechanism for throwing said agitator into and out of gear as the traveling table is moved back and forth, substantially as described.

13. In a machine for making yeast-cakes, &c., the combination, with a delivery-hopper and a traveling table provided with one or more mold-boards and having clutch-bars and guide-bars connected thereto, of a mealing-hopper having a perforated bottom, a shaft extending through said hopper, a constantly-driven pulley on said shaft, and a clutch on said shaft for engagement with said pulley, and a throw-out lever for forcing said clutch in engagement with said pulley, substantially as described.

14. In a machine for making yeast-cakes, &c., the combination, with a hopper, of suitable stirrer-screws within said hopper, presser-rolls G and G', located within said hopper at each side of said stirrer-screws, and suitable knives extending into proximity to said presser-rolls, and a traveling table provided at each end with a mold-board passing under said knives, substantially as described.

ORVILLE SPENCER HOFFMAN.

Witnesses:
GEO. P. FISHER, Jr.,
I. B. CARPENTER.